United States Patent
Liu

(10) Patent No.: US 7,629,778 B2
(45) Date of Patent: Dec. 8, 2009

(54) VOLTAGE CONVERTER

(75) Inventor: Yi-Sheng Liu, Hsinchu (TW)

(73) Assignee: Fitipower Integrated Technology, Inc., Hsinchu (TW)

( * ) Notice: Subject to any disclaimer, the term of this patent is extended or adjusted under 35 U.S.C. 154(b) by 0 days.

(21) Appl. No.: 12/133,392

(22) Filed: Jun. 5, 2008

(65) Prior Publication Data

US 2009/0180303 A1    Jul. 16, 2009

(51) Int. Cl.
G05F 1/00 (2006.01)
G05F 1/12 (2006.01)

(52) U.S. Cl. .................. 323/222; 323/282; 323/284; 323/286

(58) Field of Classification Search .................. 323/222, 323/282, 284, 285, 286, 283
See application file for complete search history.

(56) References Cited

U.S. PATENT DOCUMENTS

| | | | |
|---|---|---|---|
| 6,958,596 B1* | 10/2005 | Sferrazza et al. ............. | 323/303 |
| 7,202,643 B2* | 4/2007 | Miftakhutdinov ........... | 323/224 |
| 2003/0214274 A1* | 11/2003 | Lethellier .................... | 323/272 |
| 2004/0070376 A1* | 4/2004 | Hoshino et al. ............. | 323/267 |
| 2005/0206360 A1* | 9/2005 | Mehas et al. ................ | 323/282 |
| 2006/0103363 A1* | 5/2006 | Miftakhutdinov ........... | 323/282 |

OTHER PUBLICATIONS

Kursun et al., High Input Voltage Step-down DC-DC Converters for Integration in A Low Voltage CMOS Process, Proceedings of 2004 International Symposium on Quality of Electronic Design, Mar. 2004, p. 517-521, IEEE, San Jose, CA, USA.

* cited by examiner

Primary Examiner—Bao Q Vu
(74) Attorney, Agent, or Firm—Frank R. Niranjan

(57) ABSTRACT

An exemplary voltage converter includes a pulse width modulation controller chip, a pull-up transistor, a pull-down transistor, and a low pass filter. The pulse width modulation controller chip includes a plurality of pins, a gate control logic circuit, a first gate driver, a second gate driver, a current source, a first resistor, a first comparator, and a power-on reset circuit. The plurality of pins include a Vcc pin connected to a chip power supply, a BOOT pin connected to the Vcc pin via a first zener diode for receiving power from the chip power supply, a PHASE pin connected to the BOOT pin via a capacitor, a UGATE pin, a LGATE pin, and a GND pin that is grounded. The PHASE pin serves as a multi-function pin in the pulse width modulation controller chip.

12 Claims, 1 Drawing Sheet

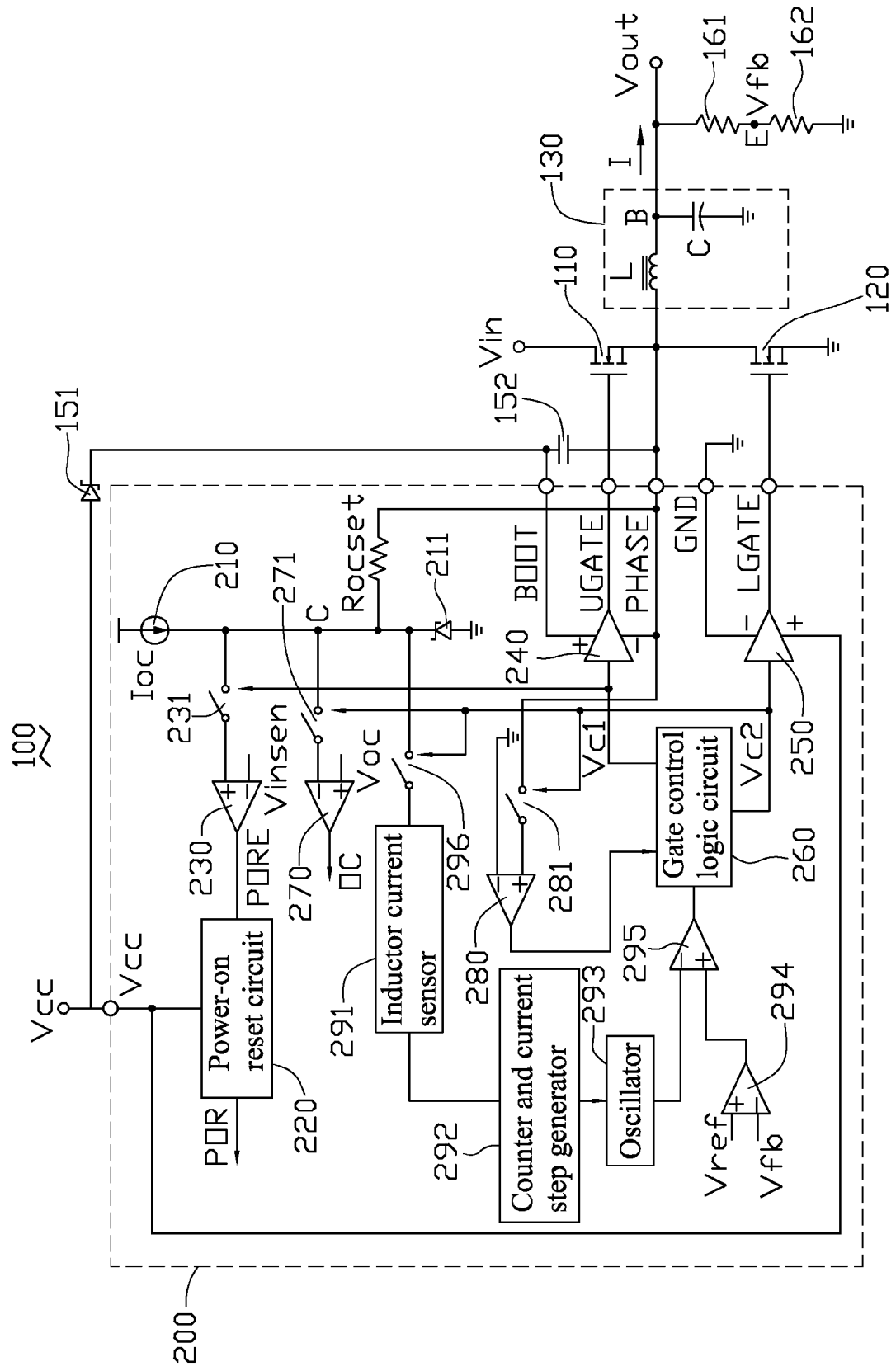

US 7,629,778 B2

VOLTAGE CONVERTER

BACKGROUND

1. Field of the Invention

The present invention relates to switching power supplies, and particularly to a DC-DC voltage converter with low power loss.

2. Description of Related Art

Direct current to direct current (DC-DC) voltage converters (voltage converter for short) based on a bridge switching circuit are widely used in various electronic devices, such as computers, mobile phones, etc. A traditional voltage converter utilizes one or more pull-up and pull-down network transistors composing the bridge switching circuit to produce an alternating current (AC) signal. The AC signal is then applied to a low pass filter including an inductor and a capacitor. The low pass filter passes the DC component of the AC signal to the output of the voltage converter to power on subsequent functional modules. Detailed structures and characteristics of the traditional voltage converter are introduced by Volkan Kursun et al., "High Input Voltage Step-down DC-DC Converters for Integration in A Low Voltage CMOS Process", IEEE Proceedings of 2004 International Symposium on Quality of Electronic Design, pp. 517-521, San Jose, Calif., USA, 22-24 Mar. 2004.

A typical voltage converter will be described. The typical voltage converter includes a pulse width modulation (PWM) controller chip, a bridge switching circuit composed of one or more pull-up and pull-down network transistors, and a low pass filter. The PWM controller chip includes a plurality of predetermined pins to perform its basic functions, such as generating control signals to turn on and off the transistors of the bridge switching circuit. However, to satisfy multi-functions, such as over-current protection, additional pins are required for the PWM controller chip. The additional pins limit the miniaturization of the voltage converter and increase the cost for the packaging of the PWM controller chip.

Therefore, an improved voltage converter is needed to address the aforementioned deficiency and inadequacies.

SUMMARY

An exemplary voltage converter includes a pulse width modulation controller chip, a pull-up transistor, a pull-down transistor, and a low pass filter. The pulse width modulation controller chip includes a plurality of pins, a gate control logic circuit, a first gate driver, a second gate driver, a current source, a first resistor, a first comparator, and a power-on reset circuit. The plurality of pins includes a Vcc pin connected to a chip power supply, a BOOT pin connected to the Vcc pin via a first zener diode for receiving power from the chip power supply, a PHASE pin connected to the BOOT pin via a capacitor, a UGATE pin, a LGATE pin, and a GND pin that is grounded. The PHASE pin serves as a multi-function pin in the pulse width modulation controller chip. The gate control logic circuit is configured for outputting a first drive signal and a second drive signal that is the inverse of the first drive signal. The current source is connected to a first node which is also connected to the cathode of a second zener diode, and the anode of the second zener diode is grounded. A terminal of the first resistor is connected to the first node, and the other terminal of the first resistor is connected to the PHASE pin.

Other advantages and novel features of the present invention will become more apparent from the following detailed description of preferred embodiment when taken in conjunction with the accompanying drawings.

BRIEF DESCRIPTION OF THE DRAWINGS

The FIGURE is a circuit diagram of a voltage converter in accordance with an exemplary embodiment.

DETAILED DESCRIPTION OF THE EMBODIMENTS

References will now be made to the drawing to describe exemplary embodiments of the present voltage converter.

Referring to the FIGURE, a voltage converter 100 includes a pulse width modulation (PWM) controller chip 200, a bridge switching circuit including a pull-up transistor 110 and a pull-down transistor 120, and a low pass filter 130. The voltage converter 100 is a boost-strap voltage converter.

The PWM controller chip 200 includes a plurality of pins, such as Vcc pin, BOOT pin, UGATE pin, PHASE pin, GND pin, and LGATE pin. The Vcc pin is connected to a chip power supply (not shown) for receiving a voltage (also labeled as Vcc). The BOOT pin is connected to the chip power supply via a zener diode 151 for receiving power from the chip power supply. The GND pin is grounded. A capacitor 152 is connected between the BOOT and PHASE pins. The PHASE pin is configured to act as a multi-function pin.

The pull-up transistor 110 and the pull-down transistor 120 are connected in series between a converter power supply (labeled as Vin) and ground. The converter power supply is the main power supply of the voltage converter 100, and is configured for supplying a voltage (also labeled as Vin). The pull-up transistor 110 is a common-drain transistor. The pull-down transistor 120 is a common-source transistor. The source of the transistor 110 is connected to the converter power supply for receiving the voltage Vin. The drain of the transistor 110 is connected to the drain of the transistor 120 and the PHASE pin of the chip 200. The gate of the transistor 110 is connected to the pin GUATE of the chip 200. The source of the transistor 120 is grounded, and the gate of the transistor 120 is connected to the LGATE pin of the chip 200.

In the exemplary embodiment, the low pass filter 130 includes an inductor L and a capacitor C. A terminal of the inductor L is connected to the PHASE pin, and another terminal of the inductor L is connected to the anode of the capacitor C. The connection node between the inductor L and the capacitor C is referred to as node B, and actually performs as an output terminal of the voltage converter 100 to output a stable DC output voltage Vout. The cathode of the capacitor C is grounded. Two resistors 161, 162 are connected in series between the node B and ground. The node between the resistors 161, 162 is referred to as node E for generating a feedback voltage Vfb supplied to a feedback pin (not shown) of the PWM controller chip 200. The feedback voltage Vfb is in direct ratio to the output voltage Vout of the voltage converter 100.

The PWM controller chip 200 includes a current source 210, a power-on reset circuit 220, a first comparator 230, a first gate driver 240, a second gate driver 250, a gate control logic circuit 260, a resistor Rocset, a second comparator 270, a third comparator 280, an inductor current sensor 291, a counter and current step generator (generator for short) 292, an oscillator 293, a fourth comparator 294, and a fifth comparator 295.

A first output terminal of the gate control logic circuit 260 is connected to the input terminal of the first gate driver 240 for outputting a first drive signal Vc1 to the driver 240. A second output terminal of the gate control logic circuit 260 is connected to the input terminal of the second gate driver 250 for outputting a second drive signal Vc2 to the driver 250. The first and second drive signals Vc1, Vc2 are reciprocal. That is, at any time, only one of the first and second drive signals Vc1, Vc2 is high/low.

The positive power supply terminal of the first gate driver 240 is connected to the BOOT pin for receiving power from the chip power supply through the zener diode 151. The negative power supply terminal of the first gate driver 240 is connected to the PHASE pin. The output terminal of the first gate driver 240 is connected to the UGATE pin for outputting a third drive signal to the transistor 110. The positive power supply terminal of the second gate driver 250 is connected to the Vcc pin. The negative power supply terminal of the second gate driver 250 is connected to the GND pin. The output terminal of the second gate driver 250 is connected to the LGATE pin for outputting a fourth drive signal to the transistor 120. In the exemplary embodiment, the first and second gate drivers 240, 250 are unity gain buffer amplifiers. Thus, the voltages and waveforms of the third and fourth drive signals are the same as the voltages and waveforms of the first and second drive signals Vc1, Vc2, respectively.

The current source 210 is connected to a node C that is connected to the cathode of a zener diode 211. The anode of the zener diode 211 is grounded. A terminal of the resistor Rocset is connected to the node C, another terminal of the resistor Rocset is connected to the PHASE pin.

In the exemplary embodiment, the power-on reset circuit 220, the first comparator 230, and the pull-up transistor 110 cooperatively constitute a power supply detecting circuit to detect an on-off state of the voltage converter 100 via the PHASE pin.

The non-inverting input terminal of the first comparator 230 is connected to the node C via a switch 231. A reference voltage Vinsen is applied to the inverting input terminal of the first comparator 230. The output terminal of the first comparator 230 is connected to a first input terminal of the power-on reset circuit 220. A second input terminal of the power-on reset circuit 220 is connected to the pin VccVcc pin. The output terminal of the power-on reset circuit 220 is configured for generating and transmitting a power-on reset signal POR to the gate control logic circuit 260. In response to the power-on reset signal, the gate control logic circuit 260 outputs the first and second drive signals Vc1 and Vc2.

The control terminal of the switch 231 is connected to the first output terminal of the gate control logic circuit 260. The switch 231 is controlled by the first drive signal Vc1, so is the transistor 110. When the transistor 110 is turned on, the switch 231 is closed and the first comparator 230 compares a voltage at the node C and the reference voltage Vinsen. That is, the first comparator 230 and the transistor 110 operate synchronously.

The power supply detecting circuit behaves in the following manner. When the PWM controller chip 200 is enabled, the gate control logic circuit 260 is then enabled. The gate control logic circuit 260 then outputs the first drive signal Vc1 to the first gate driver 240 for turning on the transistor 110 for a predetermined time period. In response to the first drive signal Vc1, the first gate driver 240 turns on the transistor 110, and closes the switch 231 to connect the node C with the non-inverting input terminal of the first comparator 230. A voltage applied at the PHASE pin becomes equal to the voltage Vin of the converter power supply. Because the node C is connected to the PHASE pin via the resistor Rocset, a voltage at the node C changes in response to a change of the voltage of the PHASE pin. In an ideal condition (e.g., the comparators in the FIGURE are ideal comparators), the voltage at the node C equals to the voltage at the PHASE pin. During the predetermined time period, if the voltage at the node C is higher than the reference voltage Vinsen, it is considered that the voltage converter 100 is powered on and ready, and the first comparator 230 outputs a PORE signal to the power-on reset circuit 220. In response to the PORE signal, the power-on reset circuit 220 outputs the power-on reset signal POR for the gate control logic circuit 260 to switch on and off the transistors 110, 120. To sum up, the power supply detecting circuit detects the on-off state of the voltage converter 100 by detecting the voltage of the PHASE pin via the resistor Rocset. Thus, the PHASE pin can be employed as a multi-function pin that can facilitate (provide) the on-off state detection function.

In response to the power-on reset signal POR, the gate control logic circuit 260 outputs the first and second drive signals Vc1 and Vc2 to the first and second gate drivers 240, 250, respectively. Because the first and second drive signals Vc1 and Vc2 are reciprocal, at any time, when one of the transistors 110 and 120 is turned on, the other is turned off. Therefore, voltage pulses swinging between ground and Vin are generated at PHASE pin to charge and discharge the capacitor C through the inductor L. Accordingly, a direct current (DC) output voltage Vout and a DC output current I are generated.

The inverting terminal of the second comparator 270 is connected to the node C via a switch 271, and a reference voltage Voc is applied to the non-inverting terminal of the second comparator 270. The output terminal of the second comparator 270 is connected to the gate control logic circuit 260 for outputting an over-current signal OC when the voltage at the node C is lower than the reference voltage Voc. The control terminal of the switch 271 is connected to the second output terminal of the gate control logic circuit 260, and controlled by the second drive signal Vc2, so is the transistor 120. When the transistor 120 is turned on, the switch 271 is closed and the second comparator 270 compares a voltage at the node C and the reference voltage Voc. That is, the second comparator 270 and the transistor 120 operate synchronously.

In the exemplary embodiment, the second comparator 270, the current source 210, the resistor Rocset, and the transistor 120 cooperatively constitute an over-current protection circuit. As described above, the voltage at the node C changes in response to the change of the voltage at the PHASE pin. In an ideal condition, the voltage at the node C equals to the voltage at the PHASE pin. It is considered that the output current of the voltage converter 100 is an over-current when the voltage at the PHASE pin/node C is lower than the reference voltage Voc. When the output current of the voltage converter 100 is an over-current, the second comparator 270 outputs the over-current signal OC to the gate control logic circuit 260. In response, the gate control logic circuit 260 turns off the transistors 110, 120 to reduce the output current I of the voltage converter 100. In conclusion, the over-current protection circuit detects an over-current condition function by detecting the voltage of the PHASE pin. That is, the PHASE pin can be employed as a multi-function pin that can facilitate the over-current protection function.

The inverting terminal of the third comparator 280 is grounded, the non-inverting terminal of the third comparator 280 is connected to the PHASE pin via a switch 281, and the output terminal of the third comparator 280 is connected to the gate control logic circuit 260. The control terminal of the switch 281 is connected to the second output terminal of the gate control logic circuit 260, and controlled by the second drive signal Vc2, so is the transistor 120. When the transistor 120 is turned on, the switch 281 is closed and the third comparator 280 compares a voltage at the node C and the reference voltage Voc. That is, the third comparator 280 and the transistor 120 operate synchronously.

In the exemplary embodiment, the third comparator 280 and the transistor 120 cooperatively constitute an inverse current protection circuit. When the voltage at the PHASE pin is lower than ground potential, it is considered that the voltage converter 100 is in a discontinue current mode (DCM), and a current referred to as an inverse current may flow from the drain of the transistor 120 to the source of the transistor 120. So when the voltage at the PHASE pin is lower than ground potential, the third comparator 280 outputs an inverse current protection signal to the gate control logic circuit 260. In response, the gate control logic circuit 260 turns off the transistor 120 to prevent the inverse current from flowing through the transistor 120. Therefore, power consumption due to the inverse current can be prevented. To sum up, the inverse current protection circuit detects the DCM by detecting the voltage of the PHASE pin. That is, the PHASE pin can be employed as a multi-function pin that can facilitate (provide) the inverse current protection function.

The inductor current sensor 291, the generator 292, the oscillator 293, the fourth and fifth comparator 294, 295, the resistor Rocset, the transistor 120, and the current source 210 cooperatively constitute a light-load efficiency improvement circuit for improving the efficiency of the voltage converter 100 in the DCM.

The input terminal of the inductor current sensor 291 is connected to the node C via a switch 296 to indirectly detect the voltage at the PHASE pin. The output terminal of the inductor current sensor 291 is connected to the input terminal of the generator 292. The output terminal of the generator 292 is connected to the input terminal of the oscillator 293 whose output terminal is connected to the inverting input terminal of the fifth comparator 295. The non-inverting input terminal of the fifth comparator 295 is connected to the output terminal of the fourth comparator 294. The output terminal of the fifth comparator 295 is connected to the gate control logic circuit 260.

The inverting input terminal of the fourth comparator 294 is connected to the node E for receiving the feedback voltage Vfb. A reference voltage Vref is applied to the non-inverting input terminal of the fourth comparator 294. In other embodiments, the inverting input terminal of the fourth comparator 294 could be directly connected to the output terminal of the voltage converter 100 for receiving the output voltage Vout.

The control terminal of the switch 296 is connected to the second output terminal of the gate control logic circuit 260, and controlled by the second drive signal Vc2, so is the transistor 120. When the transistor 120 is turned on, the switch 296 is closed to connect the input terminal of the inductor current sensor 291 to the node C. Therefore, the inductor current sensor 291 and the transistor 120 operate synchronously.

The light-load efficiency improvement circuit behaves in the following manner. When the transistor 120 turns on, the transistor 120, the current source 210, and the resistor Rocset form a loop, the current flowing through the node C equals to a current flowing through the PHASE pin. The inductor current sensor 291 detects the current flowing through the node C, and correspondingly outputs a control signal to indicate the amount of the current. The generator 292 determines whether the voltage converter 100 is in a DCM in response to the control signal. If the generator 292 determines that the current flowing through the node C is continuously to be a light-load current, it is considered that the voltage converter 100 is in the DCM. The generator 292 outputs a current to the oscillator 292 to reduce a frequency generated by the oscillator 292. In response to the reduced frequency, the gate control logic circuit 260 reduces frequencies of the first and second drive signals Vc1, Vc2. Therefore, switching frequencies of the transistors 110, 120 are correspondingly reduced. As a result, a switching loss due to the transistors 110 and 120 is reduced in the DCM, and power consumption of the voltage converter 100 is more efficient. In conclusion, in performing a light-load efficiency improvement function, the light-load efficiency improvement circuit determines whether the voltage converter 100 is in the DCM by detecting the current flowing through the PHASE pin. That is, the PHASE pin can be employed as a multi-function pin that can facilitate (provide) the light-load efficiency improvement function.

To sum up, in the exemplary embodiment, the PHASE pin is employed as a multi-function pin that can facilitate (provide) multi-functions, such as over-current protection, inverse current protection, light-load efficiency improvement, etc. Therefore, no other pin is needed in the PWM controller chip 200, and a size of the voltage converter 100 can be minimized. The cost for the package of the PWM controller chip 200 is reduced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A voltage converter, comprising:
   a pulse width modulation controller chip comprising:
   a plurality of pins, the plurality of pins comprise a Vcc pin connected to a chip power supply, a BOOT pin connected to the Vcc pin via a first zener diode for receiving power from the chip power supply, a PHASE pin acting as a multi-function pin and connected to the BOOT pin via a capacitor, a UGATE pin, a LGATE pin, and a GND pin that is grounded;
   a gate control logic circuit for outputting a first drive signal and a second drive signal that is the inverse of the first drive signal;
   a first gate driver comprising an input terminal for receiving the first drive signal, a positive power supply terminal connected to the BOOT pin, a negative power supply terminal connected to the PHASE pin, and an output terminal for outputting a third drive signal corresponding to the first drive signal;
   a second gate driver comprising an input terminal for receiving the second drive signal, a positive power supply terminal connected to the Vcc pin, a negative power supply terminal connected to the GND pin, and an output terminal for outputting a fourth drive signal corresponding to the second drive signal, the fourth drive signal is the inverse of the third drive signal;
   a current source connected to a first node which is also connected to the cathode of a second zener diode, and the anode of the second zener diode is grounded;
   a first resistor with one terminal connected to the first node, and the other terminal connected the PHASE pin;
   a first comparator for generating a control signal when a voltage at the first node is higher than a first reference voltage; and
   a power-on reset circuit for generating a power-on reset signal in response to the control signal;

a pull-up transistor comprising a gate connected to the UGATE pin for receiving the third drive signal, a source connected to a converter power supply, and a drain connected to the PHASE pin;

a pull-down transistor comprising a drain connected to the PHASE pin, a gate connected to the LGATE pin for receiving the fourth drive signal, and a source that is grounded; and a low pass filter comprising an input terminal connected to the PHASE pin, and an output terminal serving as an output terminal of the voltage converter;

wherein the gate control logic circuit generates the first and second drive signals in response to the power-on reset signal to switch the pull-up transistor and the pull-down transistor via the first and second gate driver, respectively.

2. The voltage converter as described in claim 1, further comprising a first switch connected between a non-inverting terminal of the first comparator and the first node, the first switch is controlled by the first drive signal, so that the first comparator and the pull-up transistor operate synchronously.

3. The voltage converter as described in claim 1, wherein the low pass filter comprises an inductor and a capacitor, a terminal of the inductor is connected to the PHASE pin, another terminal of the inductor serves as the output terminal of the voltage converter, and is connected to the anode of the capacitor C, and the cathode of the capacitor is grounded.

4. The voltage converter as described in claim 1, further comprising a second comparator for generating an over-current signal when the voltage at the first node is lower than a second reference voltage.

5. The voltage converter as described in claim 4, further comprising a second switch connected between an inverting terminal of the second comparator and the first node, the second switch is controlled by the second drive signal, so that the second comparator and the pull-down transistor operate synchronously.

6. The voltage converter as described in claim 1, further comprising a third comparator for generating an inverse current protection signal when a voltage at the PHASE pin is lower than ground potential.

7. The voltage converter as described in claim 6, further comprising a third switch connected between a non-inverting terminal of the third comparator and the PHASE pin, the third switch is controlled by the second drive signal, so that the third comparator and the pull-down transistor operate synchronously.

8. The voltage converter as described in claim 1, further comprising:

an inductor current sensor for detecting a first current flowing through the first node;

a counter and current step generator for generating a control signal when determines that the voltage converter is in a discontinue current mode according to the first current;

an oscillator for reducing a frequency outputted to signal the gate control logic circuit to reduce frequencies of the first and second drive signal in response to the control signal.

9. The voltage converter as described in claim 8, further comprising a fourth switch connected between the inductor current sensor and the first node, the fourth switch is controlled by the second drive signal, so that the inductor current sensor and the pull-down transistor operate synchronously.

10. The voltage converter as described in claim 8, further comprising a fourth comparator and a fifth comparator, a feedback voltage of the voltage converter is applied to an inverting input terminal of the fourth comparator, a third reference voltage is applied to the non-inverting input terminal of the fourth comparator, an output terminal of the fourth comparator is connected to a non-inverting input terminal of the fifth comparator, an inverting input terminal of the fifth comparator is connected to an output terminal of the oscillator, and the output terminal of the fifth comparator is connected to the gate control logic circuit.

11. The voltage converter as claimed in claim 10, wherein the feedback voltage equals to the output voltage of the voltage converter.

12. The voltage converter as claimed in claim 10, further comprising a second resistor and a third resistor connected in series between the output terminal of the voltage converter and ground, a node between the second and third resistors provides the feedback voltage for the fourth comparator.

* * * * *